US008331439B2

(12) United States Patent
Sedeffow (10) Patent No.: US 8,331,439 B2
(45) Date of Patent: Dec. 11, 2012

(54) PROCESSING VIDEO DATA (75) Inventor: Peter Vassilev Sedeffow, London (GB)

(73) Assignee: Saffron Digital Limited, London (GB)

( * ) Notice: Subject to any disclaimer, the term of this patent is extended or adjusted under 35 U.S.C. 154(b) by 1259 days.

(21) Appl. No.: 12/113,403

(22) Filed: May 1, 2008

(65) Prior Publication Data
US 2008/0273594 A1 Nov. 6, 2008

(30) Foreign Application Priority Data

May 2, 2007 (GB) .................................. 0708440.3
May 10, 2007 (GB) .................................. 0709030.1

(51) Int. Cl.
*G01R 31/08* (2006.01)
*H04N 7/18* (2006.01)

(52) U.S. Cl. ...................... 375/240.03; 370/252; 725/74

(58) Field of Classification Search ............ 375/240.03, 375/240.08, 240.12, 240.16, 240.18, 240.24; 725/31, 74, 78, 80, 81, 89; 726/1, 32; 370/249, 370/252, 389, 468, 473
See application file for complete search history.

(56) References Cited

U.S. PATENT DOCUMENTS

| 5,592,226 | A | | 1/1997 | Lee et al. | |
|---|---|---|---|---|---|
| 5,822,524 | A | * | 10/1998 | Chen et al. ..................... | 709/203 |
| 6,118,817 | A | * | 9/2000 | Wang ........................ | 375/240.03 |
| 6,233,359 | B1 | * | 5/2001 | Ratnakar et al. ............... | 382/250 |
| 6,330,369 | B1 | * | 12/2001 | Cornog et al. ................. | 382/251 |
| 6,356,668 | B1 | * | 3/2002 | Honsinger et al. ............. | 382/251 |
| 6,563,517 | B1 | * | 5/2003 | Bhagwat et al. ............... | 715/735 |
| 6,970,602 | B1 | * | 11/2005 | Smith et al. .................... | 382/232 |
| 6,995,769 | B2 | * | 2/2006 | Ordentlich et al. ............ | 345/520 |
| 2002/0136296 | A1 | * | 9/2002 | Stone et al. ............... | 375/240.03 |
| 2002/0169823 | A1 | * | 11/2002 | Coulombe et al. ............ | 709/203 |
| 2003/0002743 | A1 | * | 1/2003 | Ohta et al. ..................... | 382/239 |

(Continued)

FOREIGN PATENT DOCUMENTS

EP 1596594 11/2005

(Continued)

OTHER PUBLICATIONS

Real—"Delivering Total Mobile TV: Combining Streaming and Broadcast for a Complete Mobile Television Solution"; C. Steck http://docs.real.com/docs/industries/DeliveringTotalMobileTV.pdf. Apr. 2006. Rev. 1.0.2; 12 pages (emphasizing p. 9).

*Primary Examiner* — Michael Thier
*Assistant Examiner* — Prince A Mensah
(74) *Attorney, Agent, or Firm* — Harness, Dickey & Pierce, P.L.C.

(57) ABSTRACT

The optimising of video data files for downloading to a mobile device is disclosed, in which the total data volume of the file is limited. An input video clip of image frames is coded to produce a first coded video data file having a predetermined data volume. A measure of spatial data loss is obtained and the obtained measure of data loss is compared against a predetermined data loss value. If too much spatial loss has occurred, frames are removed from the input clip and a re-coding process is performed of the input video clip to produce an alternative output data file. Preferably, the data frame-rate is not allowed to drop below a predetermined minimum and if too much spatial loss still occurs, audio quality is reduced.

11 Claims, 8 Drawing Sheets

U.S. PATENT DOCUMENTS

| | | | |
|---|---|---|---|
| 2003/0007558 A1* | 1/2003 | Vetro et al. | 375/240.03 |
| 2003/0031371 A1* | 2/2003 | Kato et al. | 382/239 |
| 2003/0043905 A1* | 3/2003 | Nakayama et al. | 375/240.04 |
| 2003/0067981 A1* | 4/2003 | Zhao et al. | 375/240.08 |
| 2003/0086597 A1* | 5/2003 | Ohta et al. | 382/131 |
| 2003/0228063 A1* | 12/2003 | Nakayama et al. | 382/251 |
| 2004/0165783 A1* | 8/2004 | Reynolds et al. | 382/239 |
| 2004/0255139 A1* | 12/2004 | Giobbi | 713/193 |
| 2005/0166245 A1* | 7/2005 | Shin et al. | 725/104 |
| 2005/0278794 A1 | 12/2005 | Leinonen et al. | |
| 2006/0045020 A1* | 3/2006 | Picco et al. | 370/249 |
| 2006/0056508 A1* | 3/2006 | Lafon et al. | 375/240.03 |
| 2006/0095942 A1* | 5/2006 | van Beek | 725/81 |
| 2006/0095944 A1* | 5/2006 | Demircin et al. | 725/81 |
| 2006/0154648 A1 | 7/2006 | Oh et al. | |
| 2006/0190410 A1 | 8/2006 | Harper | |
| 2006/0198392 A1* | 9/2006 | Park et al. | 370/468 |
| 2007/0002946 A1* | 1/2007 | Bouton et al. | 375/240.01 |
| 2007/0086680 A1* | 4/2007 | Lim | 382/298 |
| 2007/0098162 A1 | 5/2007 | Shin | |
| 2007/0103484 A1* | 5/2007 | Hougui et al. | 345/600 |
| 2007/0271106 A1* | 11/2007 | Lee et al. | 705/1 |
| 2007/0283269 A1* | 12/2007 | Obrador et al. | 715/723 |
| 2008/0084925 A1* | 4/2008 | Rozen et al. | 375/240.01 |
| 2008/0196076 A1* | 8/2008 | Shatz et al. | 725/116 |

FOREIGN PATENT DOCUMENTS

| | | |
|---|---|---|
| EP | 1659736 | 5/2006 |
| EP | 1732333 | 12/2006 |
| EP | 1770957 | 4/2007 |
| JP | 2003299064 | 3/2002 |
| JP | 2005260541 | 3/2004 |
| JP | 2005311459 | 4/2004 |
| WO | WO 97/04585 | 2/1997 |
| WO | WO 00/18137 | 3/2000 |
| WO | WO 2005/083917 | 9/2005 |
| WO | WO 2006/077526 | 7/2006 |

* cited by examiner

PROCESSING VIDEO DATA

CROSS REFERENCE TO RELATED APPLICATIONS

This application claims priority from United Kingdom Patent Application Number 0708440.3. filed 2 May 2007 and United Kingdom Patent Application Number 0709030.1 filed 10 May 2007, the entire disclosures of which are incorporated herein by reference in their entirety.

BACKGROUND OF THE INVENTION

1. Field of the Invention

The present invention relates to processing video data for downloading to a mobile device.

2. Description of the Related Art

The transmission of video data files over the internet is well known. The video data may be displayed after the whole of the file has been received. Consequently, a highly compressed data file may be transmitted at a higher rate than display rate or alternatively. large data files may be transmitted at less than display rate (possibly overnight) to be displayed later. In computing systems, these approaches are all possible given the high level of processing power available to browsers and the relatively high level of local storage available.

When downloading data to mobile devices it is highly likely that an upper limit will be placed on the size of a downloadable file. This limit may be restricted in terms of the storage capacity available at the mobile device or more likely, due to transmission restrictions within the network itself. It is therefore necessary to process video data to ensure that the resulting data file is not too large while at the same time limiting the effects of degradation due to data compression.

BRIEF SUMMARY OF THE INVENTION

According to a first aspect of the present invention, there is provided a method of downloading video data to a mobile device, wherein the data is downloaded from a server to a personal computer and then said data is transferred from said personal computer to the mobile device, wherein the data transferred from the server to the computer is encrypted and said encrypted file is transferred to the mobile device: and a decryption key is transmitted directly from the server to the mobile device.

According to a second aspect of the present invention, there is provided a method of processing video data for downloading to a mobile device, in which the total data volume of an output file is limited, comprising the steps of: coding an input video clip of image frames to produce a first coded video data file having a predetermined data volume; obtaining a measure of spatial data loss; comparing said obtained measure of data loss against a predetermined data loss value; and if too much spatial loss has occurred, removing frames from said input clip and recoding the input video clip to produce an output data file.

Preferably, the recoding step with even fewer frames is performed again until the degree of spatial loss has become acceptable. However, in a preferred embodiment, the frame rate is not allowed to drop below a predetermined minimum and if too much spatial loss occurs, audio quality is reduced.

According to a third aspect of the present invention, there is provided video data processing apparatus configured to process video data for downloading to mobile devices, in which the total data volume of an output file is limited, comprising: a coder for coding an input video clip of image frames to produce a first coded video data file having a predetermined data volume; and a processing device arranged to receive a measure of spatial data loss, compare said obtained measure of data loss against a predetermined data loss value and if too much spatial loss has occurred, to remove frames from said input clip and to recode the input video clip to produce an output data file.

DESCRIPTION OF THE BEST MODE FOR CARRYING OUT THE INVENTION

Figure 1:
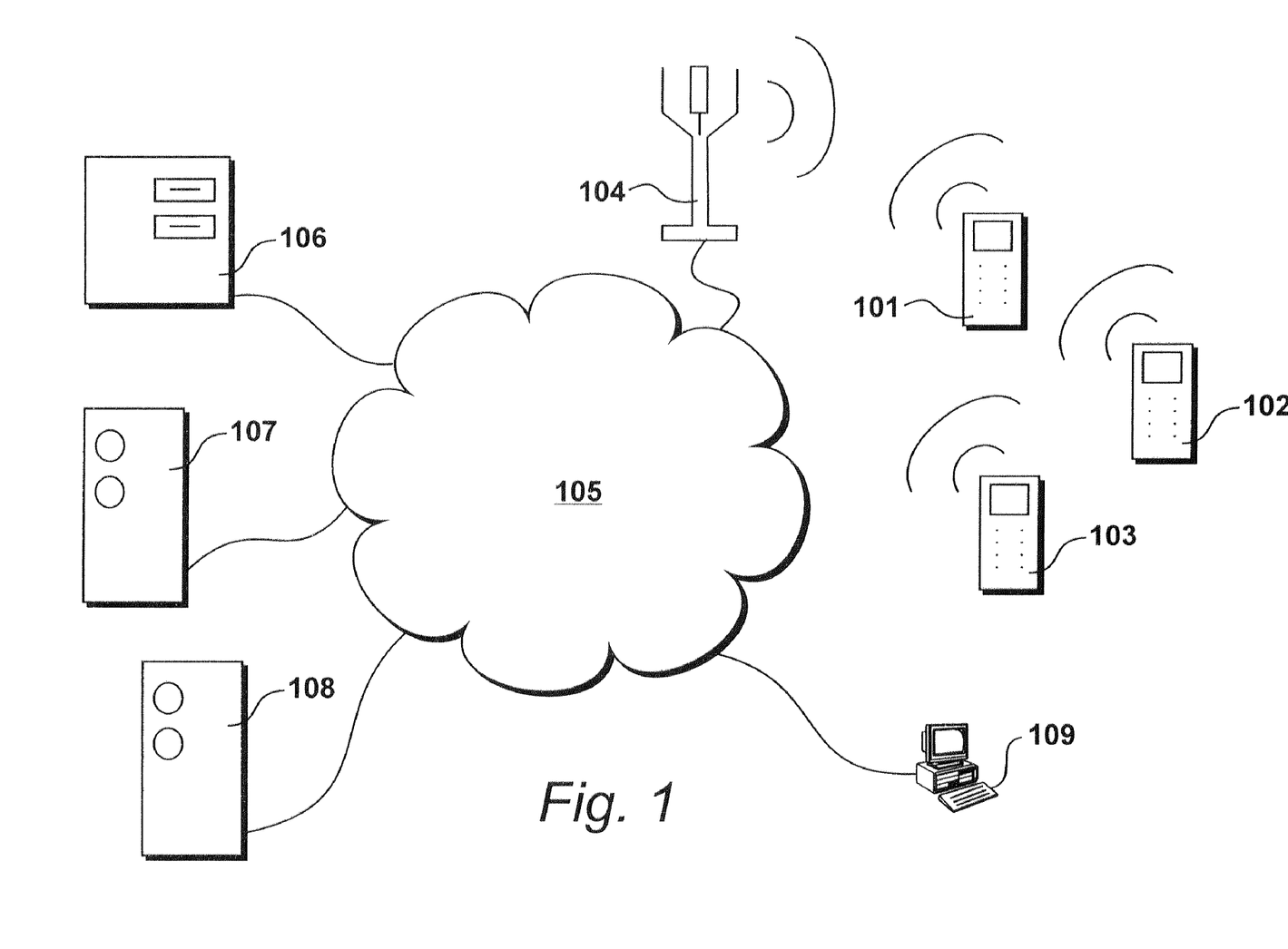
FIG. 1 shows an environment having mobile devices.

FIG. 1 shows an environment in which video data may be streamed to mobile devices. Typical mobile devices are illustrated at 101, 102 and 103. The mobile devices may be mobile cellular telephones but alternatively they could be personal digital assistants, gaming consoles or ultra mobile personal computers or any other type of mobile device fitted with mobile telephony.

Mobile devices 101 to 103 communicate with the base station 104, that in turn communicates with a network 105. Network 105, shown in FIG. 1, represents all relevant interconnected networks including private exchanges and the Internet etc. The mobile devices 101 to 103 execute wireless applications and as such communicate with a wireless applications protocol (WAP) server 106. Server 106 is responsible for serving many types of wireless applications to the mobile devices and the present embodiment is concerned with the streaming of video material, including feature length productions. Traditionally, material of this type has not been streamed to mobile communications devices for many reasons, including poor viewing quality.

Video material is stored in compressed form on video servers, including video server 107 and video server 108. Servers 107 and 108 could be administered by totally independent organisations, each having access to particular legally protected assets. Each asset may be identified by a resource locator and the video material itself is provided to the requesting mobile devices using real-time streaming protocol (RTSP).

When a mobile device, such as device 101 has been provided with the details of an asset location, it is possible for the mobile device itself to issue commands to the appropriate server resulting in the information being streamed. However, in most networks, the total amount of available bandwidth is limited and this limitation in itself, irrespective of the capabilities of the device, will place restrictions on the amount of data that may be streamed and will ultimately result in a degradation of spatial quality.

In order for video data to be streamed to mobile devices, it is necessary to perform data compression upon the video images. Many video compression techniques are known, predominately developed for broadcast purposes and for file download purposes. It is known to download complete files to mobile devices using compression techniques. However, the present applicant has appreciated that compression procedures optimised for file download may result in less than optimum performance when used for streaming.

Figure 2:
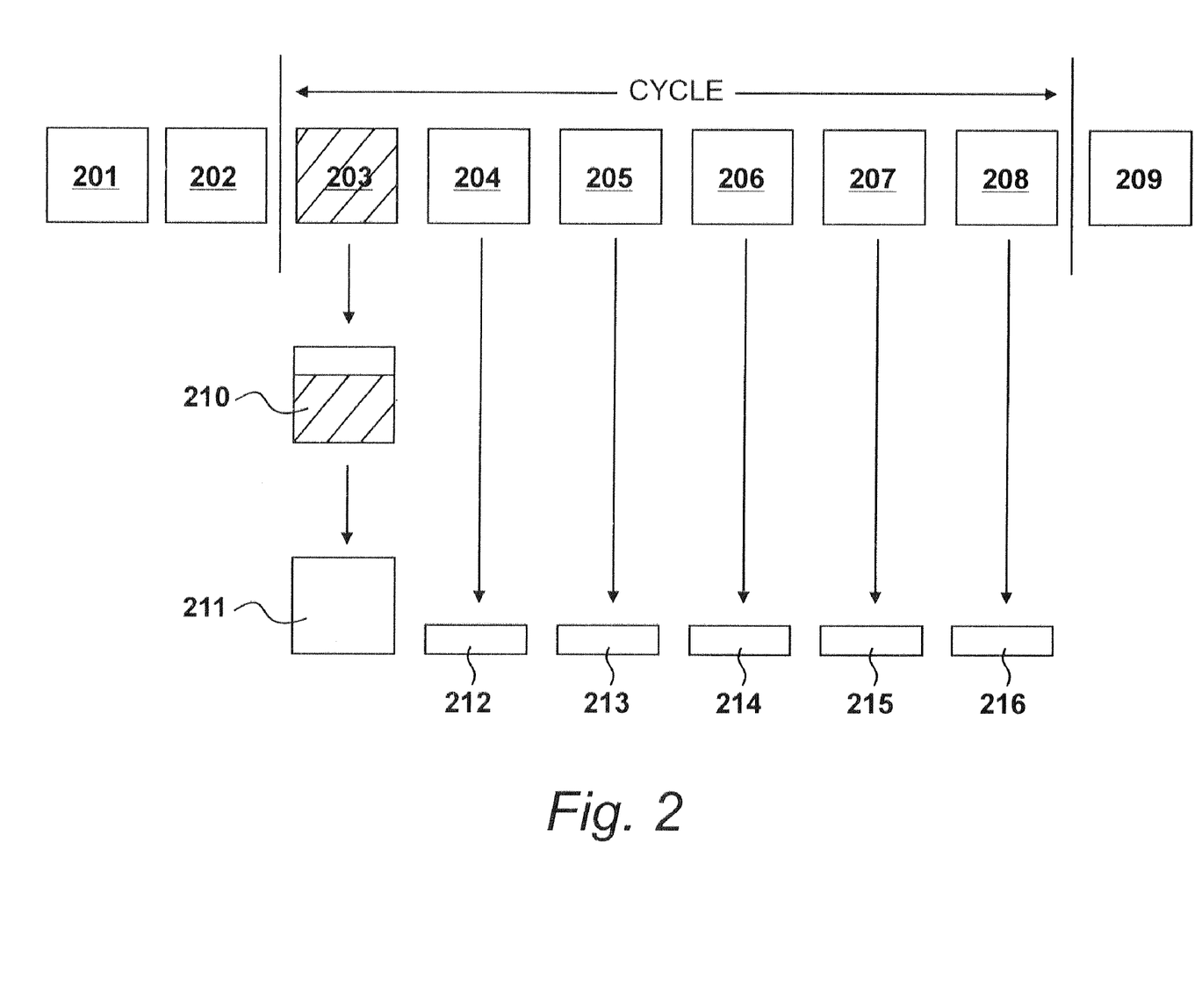
FIG. 2 illustrates a typical process for the compression of video data.

FIG. 2 illustrates a typical process for the compression of video data. A video clip is represented by uncompressed video frames 201 to 209. The compression technique identifies a cycle of frames which in this example is represented by frame 203 to frame 208, that is a total of 6 frames. However, it should be appreciated that many cycles include many more frames and the example shown in FIG. 2 is put forward for illustration only.

The first frame in the cycle, frame 203 is selected and processed to produce a spatially compressed frame 210. The spatially compressed frame is produced by identifying tiles of pixels within the image frame and performing a discrete cosine transform algorithm upon them; effectively transforming intensity values to frequency values. This results in a level of data compression. Furthermore, a greater level of compression may be obtained by a further truncation process resulting in a further compressed frame 211 which is now taken as the first frame in the compressed cycle.

With reference to frame 211, subsequent frames in the cycle, namely frames 204 to 208 are compressed to an even higher degree by effectively performing similar transforms and then comparing values with respect to the previous frame. Thus, by these processes of spatial and temporal compression it is possible to produce highly compressed frames within the cycle, namely frames 212, 213, 214, 215 and 216. In many compression procedures of this type, frames that have been compressed spatially, namely frames 210 and 211, are referred to as I frames. The subsequent frames within the cycle that have also undergone temporal compression are referred to as P frames.

The present applicant has appreciated that the size of the P frame (frames 212 to 216) may be reduced significantly if their proceeding I frame is maintained to a very high spatial quality. This will result in the size of the I frame being relatively large but in terms of the total size of the data, the overall size will be reduced because the following P frames become very small.

Figure 3:
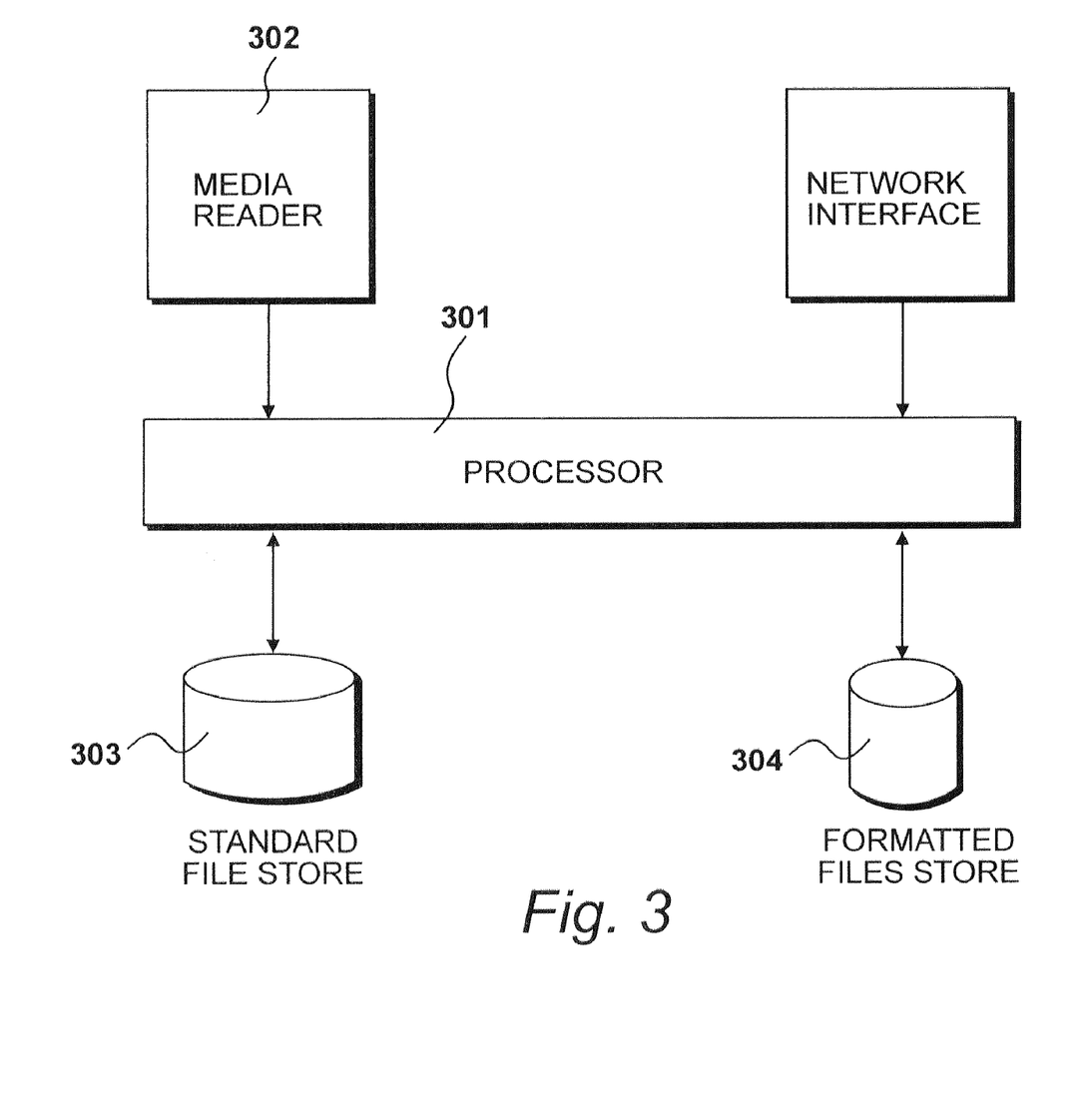
FIG. 3 shows a hardware platform for processing video data.

FIG. 3 illustrates a hardware platform for processing video data in accordance with a preferred embodiment of the present invention. A processor 301 receives input media data from a media reader 302. For each video asset a standard file is stored in a standard file store 303. The standard file may for example include images at a definition of 368×288 pixels which allows many commercial renditions to be made by an appropriate cropping process. Thus, data may be received that is compatible with the standard files or alternatively received data may be appropriately processed and recorded in the standard file store.

When implementing the preferred aspects of the present invention, the processor 301 reads a standard file from the standard file store 303 and performs a coding operation so as to create the file in accordance with a particular format. Subsequently, when a request is made for a file it is possible for a database to determine the nature of the caller and thereafter provide an appropriately formatted video asset. Furthermore, formatted files may be transferred to dedicated asset servers and multiple copies may be instantiated so as to satisfy any level of demand within the network. Locally, formatted files are written to the formatted files store 304. Typically, for streaming purposes, several different formats will be recorded in the formatted files store and therefore several coding processes will take place for each standard file.

Figure 4:
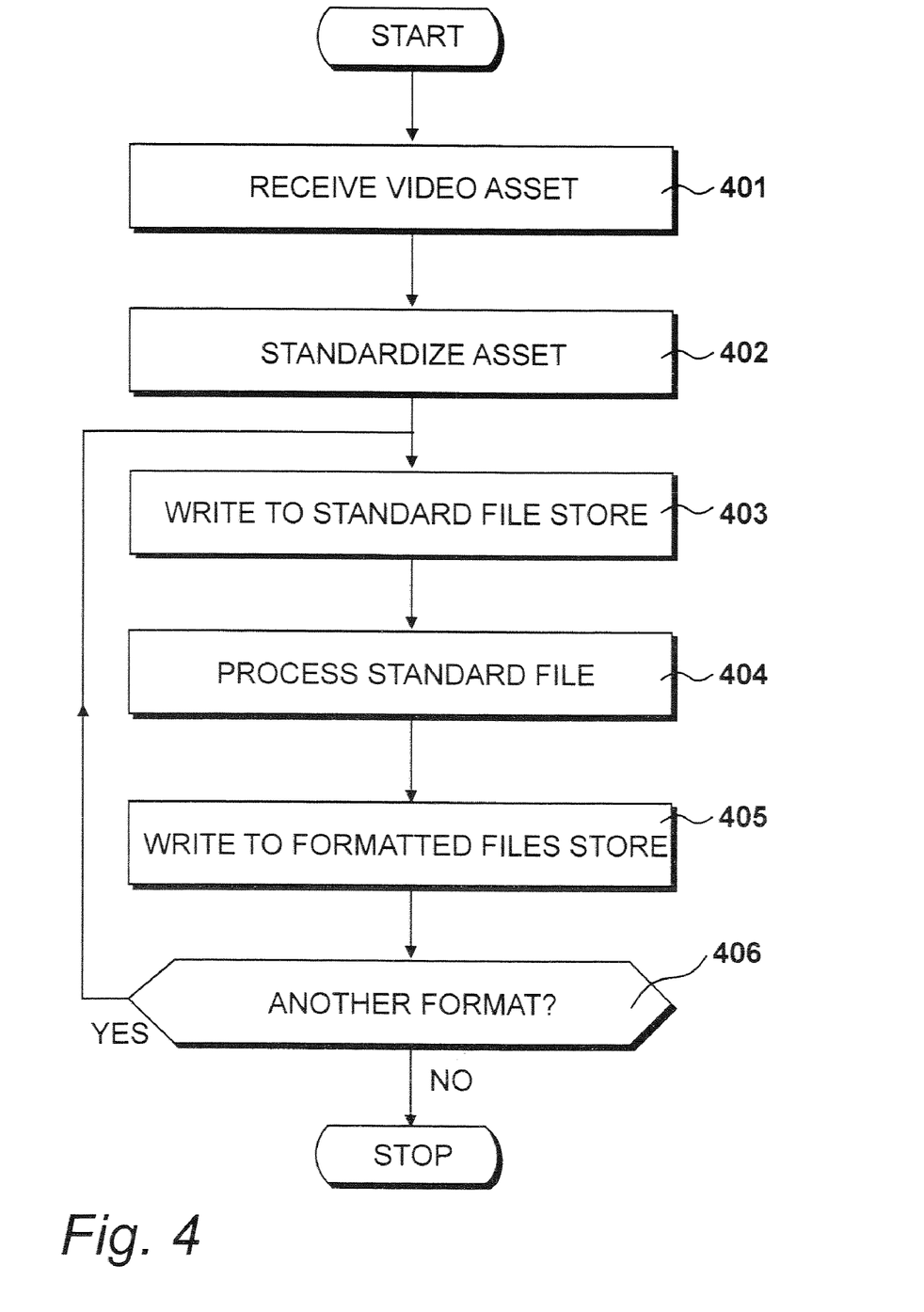
FIG. 4 illustrates processes performed by processor 301.

FIG. 4 illustrates processes performed by processor 301 in order to implement preferred aspects of the present invention.

At step 401 a video asset is received via the media reader 302 and at step 402 the asset is standardized, on the assumption that such a standardization process is required.

At step 403 the standard file produced at step 402 is written to the standard file store 303 at step 403.

At step 404 the standard file is processed in accordance with a preferred aspect of the present invention resulting in a formatted file being written to the formatted files store at step 405.

At step 406 the question is asked as to whether another format is required and when answered in the affirmative control is returned to step 403. Eventually, all of the formats will have been produced and the process ceases.

It can therefore be seen that the procedure shown in FIG. 4 will be implemented when a new video asset is received. Furthermore, in a preferred implementation, existing standardized assets will be formatted when new formats are adopted an implemented in the field.

Figure 5:
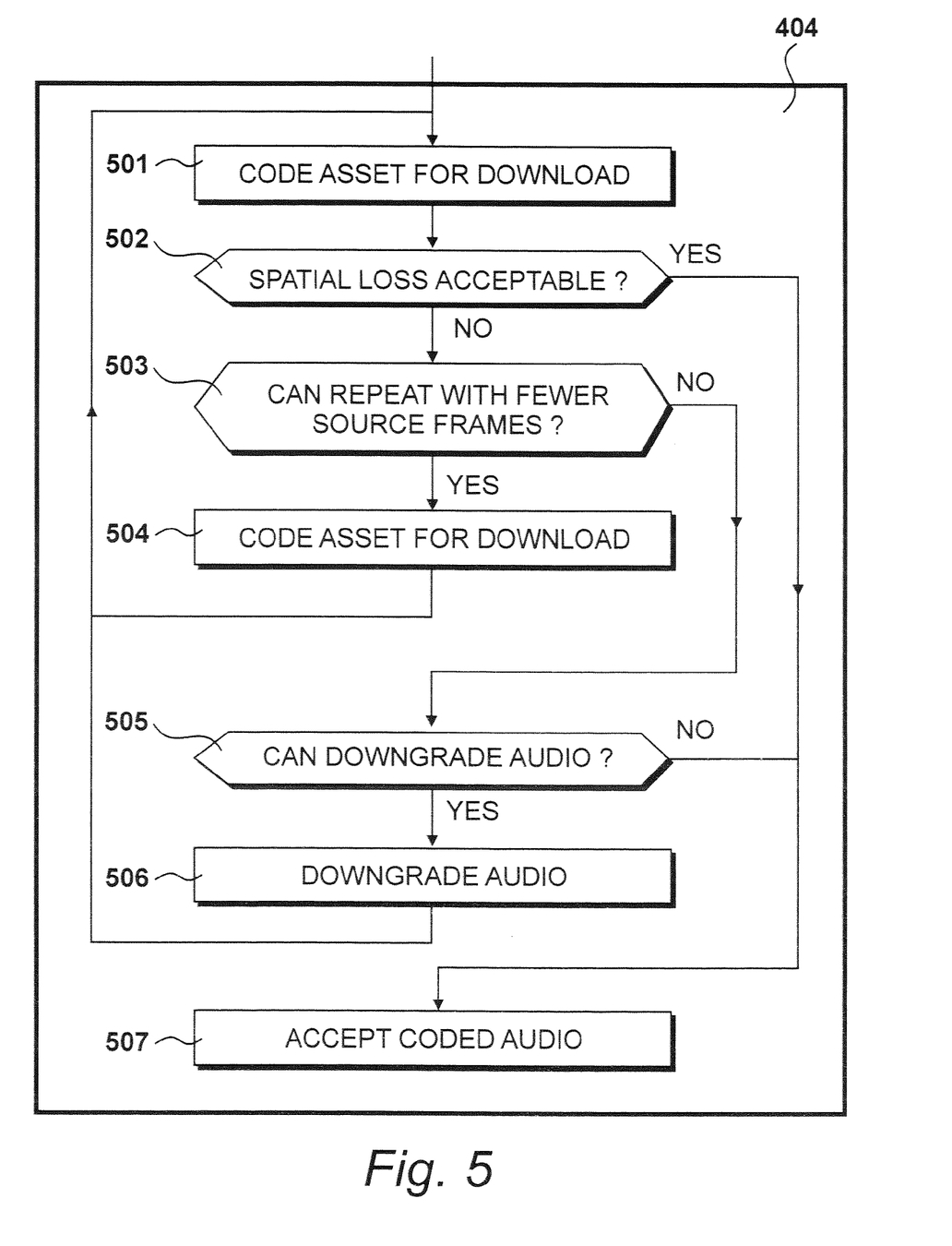
FIG. 5 details procedures 404 for processing the standard file.

FIG. 5 details procedures 404 for processing the standard file. Many download protocols are adopted in the preferred embodiment therefore the standard file will be processed many times in order to ensure that all live protocols have been written to the formatted files store. Furthermore, in a preferred embodiment, when a new formatting standard is adopted, existing standard files are read from the standard file store and processed so as to maintain an updated formatted files store thereby ensuring that all preferred download formats are available.

Server 106 maintains a database of mobile device preferences. Consequently, in response to a request being made, the server is aware of the type of device making the request and as such will provide a link to an appropriately formatted file, stored on an appropriate asset server, such as server 107.

At step 501 the asset it coded for downloading whereafter at step 502 a question is asked as to whether the spatial loss is acceptable. In this respect, all standard codecs include provision for the generation of a parameter (usually ranging from 1 to 32) representing the degree of truncation that has occurred, with a low value representing low truncation and a high value representing high truncation. For any particular clip an average level of truncation may be identified which in turn will represent a degree of spatial degradation. Thus, for example, for a particular codec a truncation level of, say, 10 may be selected such that if a truncation level above 10 were to occur on average for a particular clip, the degree of spatial loss would be considered unacceptable and the question asked at step 502 would be answered in the negative. Alternatively, if the spatial loss is acceptable and the question asked at step 502 is answered in the affirmative, the coded file is accepted at step 507.

Assuming the spatial loss is unacceptable, resulting in the question asked at step 502 being answered in the negative, a question is asked at step 503 as to whether the coding process may be repeated with fewer source frames. Thus, in accordance with a preferred aspect of the present embodiment, the applicant has ascertained that, with mobile devices, high perceived quality is achieved if the spatial definition is not allowed to degrade too far. In particular, the applicant has appreciated that under some circumstances it is preferable to drop frames rather than allow too much spatial degradation. Consequently, after performing a coding exercise upon a clip, if the spatial degradation is considered too low (the average truncation being too high) frames are removed from the input source clip and the coding operation is performed again. Thus, if the question asked at step 503 is answered in the affirmative, to the effect that the source frames may be removed, the removal takes place at step 504 and control is returned to step 501 so that the coding operation may be performed again.

The exercise of removing source frames and repeating the coding operation may occur several times until an acceptable degree of spatial degradation has been obtained. Experiments suggest that many typical clips will converge in an average of 3 or 4 iterations. However, in some circumstances it is not possible to obtain an acceptable level of spatial loss while at the same time retaining an acceptable level of different frames. The question asked at step 503 as to whether the coding operation may be repeated with fewer frames will be answered in the negative on 2 occasions. Firstly, a limit is placed in terms of a minimum frame rate. For example, in a preferred embodiment, a frame rate of less than 10 frames per second may be considered unacceptable. In other embodiments, for example, a frame rate of less than 15 frames per second may be considered unacceptable. Thus, if the frame rate is too low it will not be possible to remove further frames and the question asked at step 503 will be answered in the negative.

Another situation occurs when too many iterations have occurred. Thus, a counter may be provided to ensure that the loop between steps 504 and 501 is not repeated more than 10 times.

With the question asked at step 502 being answered in the negative, to the effect that the spatial loss is considered unacceptable and with the question asked at step 503 being answered in the negative to the effect that no more frames may be dropped, a problem exists in that the resulting downloadable file (having a predetermined volume) cannot be displayed with an acceptable spatial resolution and with an acceptable frame rate. In accordance with a preferred aspect of the present invention, it is therefore considered preferable to take further action in order to reduce the totality of the data volume, while retaining a minimum spatial definition and while retaining a minimum frame rate.

In a preferred embodiment, a question is asked at step 505 as to whether it is possible to downgrade the audio track association with the video. This approach is particularly attractive for large files where a modest downgrading in the audio track can result in substantial savings in terms of the overall data volume. Thus, if the question asked at step 505 is answered in the affirmative, the audio track is downgraded and a recoding operation is performed, now with more video bandwidth available such that it may be possible to obtain acceptable spatial definition and acceptable frame rates. Thus, if the spatial loss is now considered to be acceptable, the question asked at step 502 will be answered in the affirmative and the file will be accepted. Alternatively, the question asked at step 502 will be answered in the negative and again the question asked at step 503 will be answered in the negative. Consequently, the question asked at step 505 will be asked again as to whether it is possible to further degrade the audio track. Again, this question may be answered in the negative to the effect that a minimum value has been reached or alternatively the loop may have been traversed too many times. Under these circumstances the coded file may be accepted, directed for additional processing or flagged to the effect that a problem exists.

Figure 6:
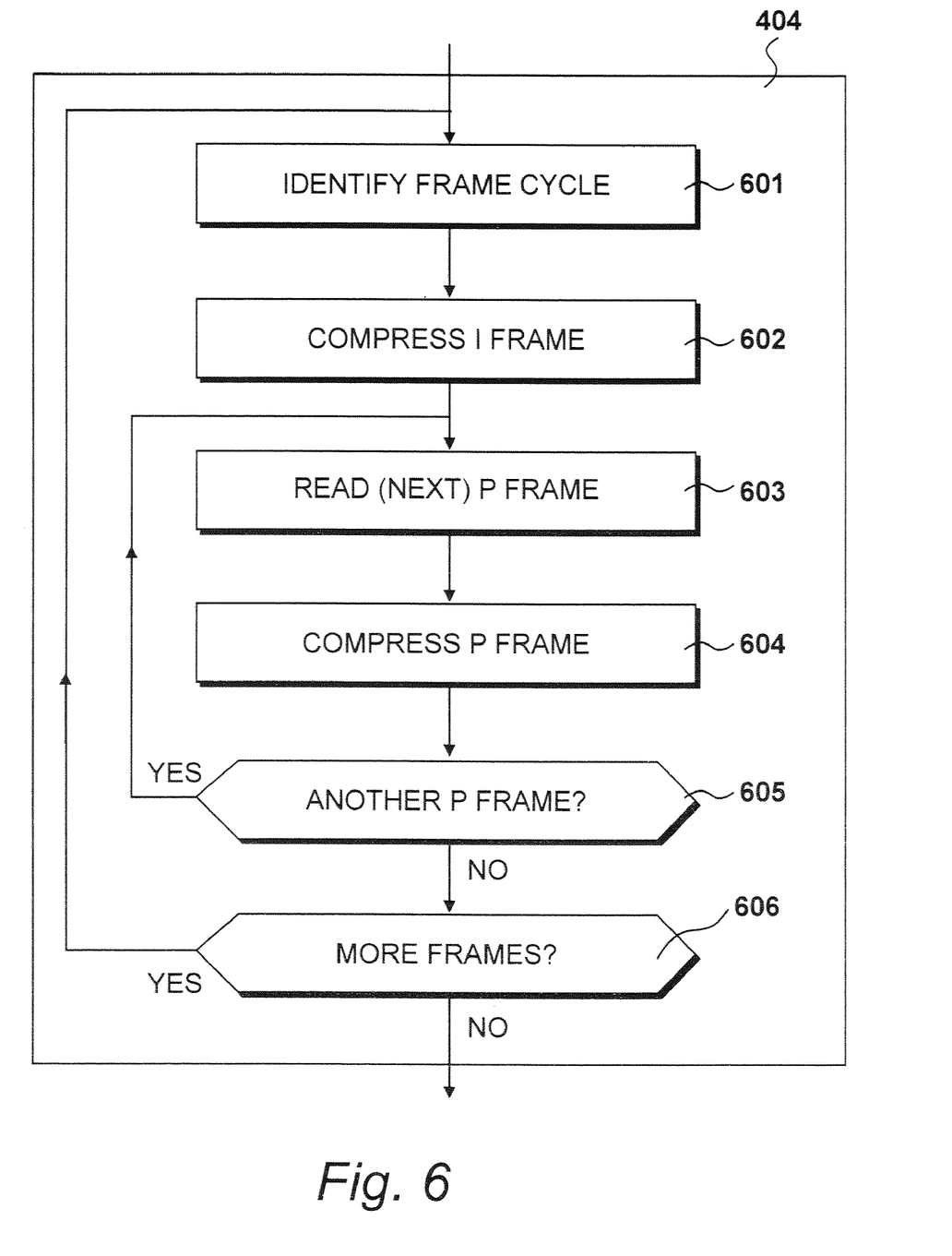
FIG. 6 illustrates an example of a known coding procedure.

FIG. 6 illustrates an example of a known coding procedure and therefore details the coding procedures performed at step 501.

At step 601 a frame cycle is identified, the length of which being defined by the parameters established previously.

At step 602 the I frame of a cycle is compressed.

At step 603 the first P frame is read, and the P frame is compressed at step 604. As described, this compression will include spatial compression and temporal compression.

At step 605 a question is asked as to whether another P frame is to be compressed and when answered in the affirmative the next P frame is selected at step 603.

Having compressed all of the P frames within the cycle, the question asked at step 605 will be answered in the negative resulting in a question being asked at step 606 as to whether more frames are to be processed. Thus, when the question asked at step 606 is answered in the affirmative, control is returned to step 601 and the next frame cycle is identified.

Figure 7:
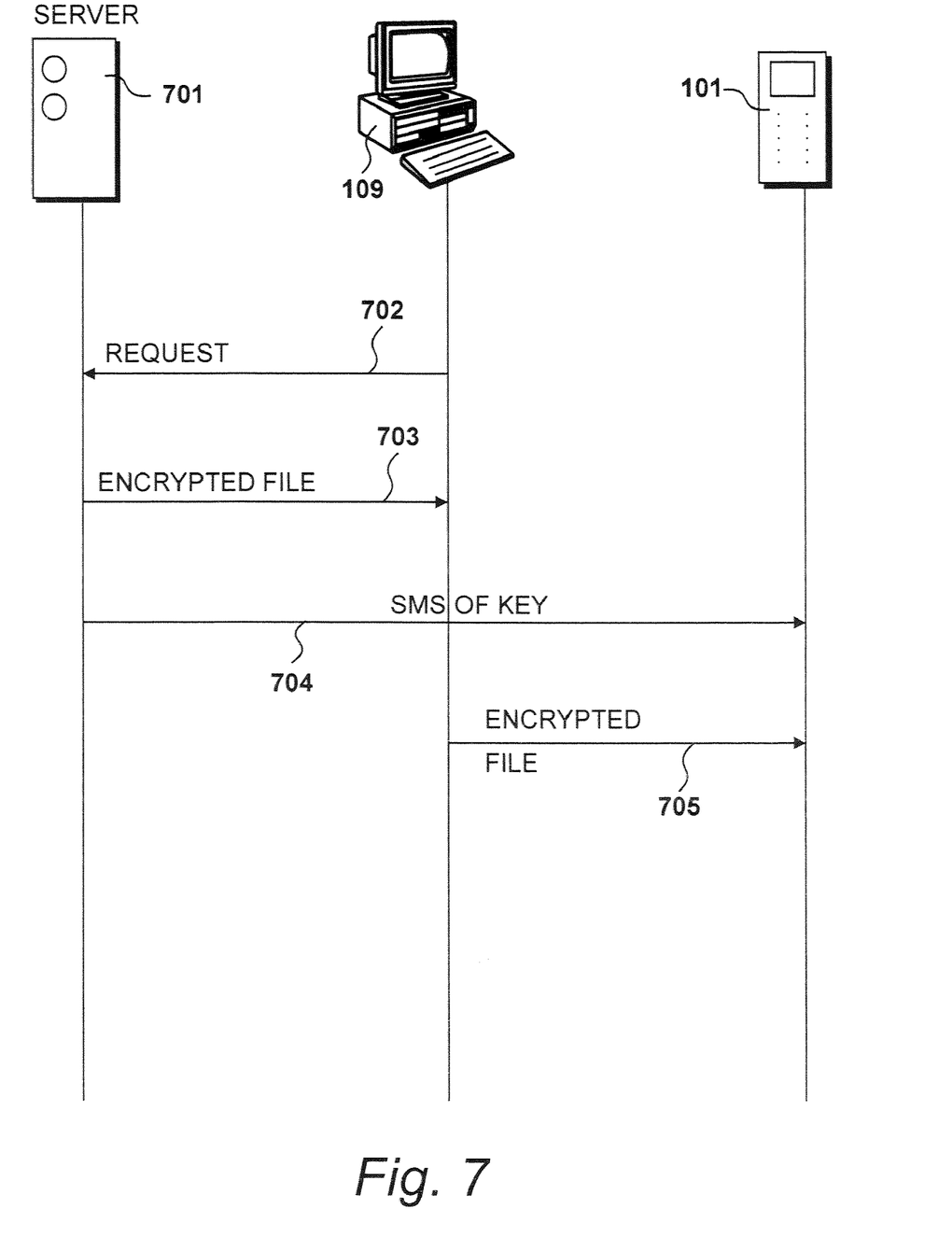
FIG. 7 shows a telecommunications diagram representing an embodiment of the invention.

FIG. 7 illustrates an alternative proposal for the downloading of video files. As previously described, a preferred embodiment of the present invention relates to the downloading of video asset files directly to mobile devices, such as mobile device 101. The asset is streamed from an asset server, say server 107, and supplied to base station 104. From base station 104 radio communication supplies the file to the mobile device 101.

In addition to supplying files to mobile devices, it is also possible to provide similar files to high-bandwidth devices, such as computer system 109. Thus, data held at asset server 108, say, could be supplied directly to computer system 109 and the asset could be viewed at system 109. When a download of this type takes place, bandwidth restrictions created by the radio network are not present therefore substantially larger files may be downloaded in this way.

Increasingly, mobile devices are provided with larger memory capacities, therefore it is possible for larger data files to be viewed at mobile devices. However, restrictions in the radio network would still be present therefore this would prevent large files being downloaded to mobile devices.

A third approach exists in that it would be possible to download large data files to computer system 109 and then effect a transfer from the computer system 109 to the mobile device 101, under an appropriate physical connection or by using a local radio network such as Bluetooth. However, this could create a problem in that having downloaded the file to computer system 109 it could in theory be conveyed to multiple mobile devices in an environment where a customer has only paid for a single viewing.

A preferred embodiment of the present invention therefore establishes a communications topology as illustrated in the telecommunications diagram of FIG. 7. In this illustration, servers are shown collectively as server 701. In addition, computer system 109 is illustrated along with mobile device 101, in this example implemented as a mobile cellular telephone.

The procedure is initiated by the computer system 109 issuing a request 702 to the server 701 (in practice the applications server 106).

The server 701 encrypts the file using digital rights management techniques. The encrypted file is then returned to the requesting computer 109, as illustrated at 703. Thus, in order to view the file it is necessary to provide a decryption key and if a user has identified an intention to view the file on a mobile phone, as distinct from viewing it locally at the computer, the computer 109 is not itself provided with the key. Thus, the computer system 109 has now received the encrypted file but is not in a position to actually view the file.

As shown at 704, the decryption key is provided directly from the server 701 to the mobile device 101. Preferably, the transmission of the key takes place using the short message service (SMS) or similar data transfer protocol present within the mobile telephony system. The computer 109 is therefore provided with the encrypted file, which may be a relatively large file, and the mobile device 101 is provided with the decryption key. Consequently, as shown at 705 the encrypted file is transferred from the computer system 109 to the mobile phone 101 locally. The mobile phone 101 therefore now has the encrypted file and the key enabling the file to be decrypted. It is therefore possible to view the file asset at mobile device 101. It is also possible for the encrypted file to be supplied to other mobile devices. However, these mobile devices have not been provided with the decryption key therefore it is not possible for the asset to be viewed.

Figure 8:
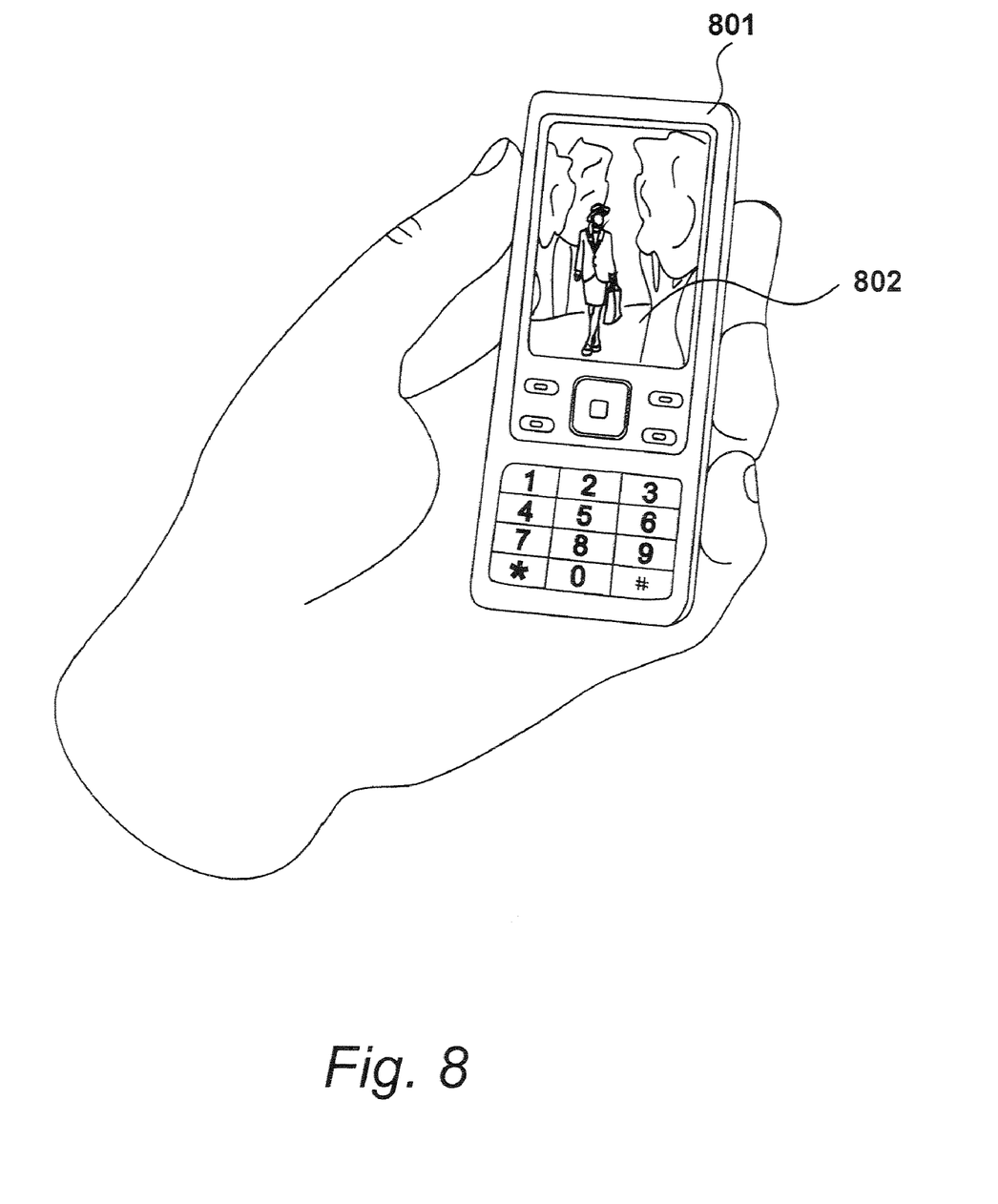
FIG. 8 shows the type of result that is possible when video assets are streamed to mobile phones.

FIG. 8 illustrates the type of result that is possible when video assets are streamed to mobile phones. Mobile phone, or similar mobile device. 801 may be hand held and a video asset viewed via a display screen 802.

The invention claimed is:

1. Video data processing apparatus configured to process video data for downloading to mobile devices, in which the total data volume of an output file is limited, comprising:
 a coder for coding an input video clip of image frames to produce a first coded video data file having a predetermined data volume;
 and a processing device arranged to receive from said coder a measure of spatial data loss caused by said coding, to compare said obtained measure of data loss against a predetermined data loss value and if too much spatial loss has occurred, to remove frames from said input clip and to recode the input video clip to produce an output data file;
 wherein said re-coding step with even fewer frames performed again until the degree of spatial loss has become acceptable;
 wherein the frame-rate is not allowed to drop below a predetermined minimum;
 and if too much spatial loss still occurs, audio quality is reduced.

2. The apparatus as claimed in claim 1, wherein said mobile devices are mobile cellular telephones.

3. The apparatus as claimed in claim 1, wherein standard files are written to a standard file storage device and files formatted from standard files are written to a formatted files storage device.

4. A method of optimising a video data file for downloading to a mobile device, in which the total data volume of the file is limited, comprising the steps of:
 coding an input video clip of image frames to produce a first coded video data file having a predetermined data volume;
 obtaining a measure of spatial data loss caused by said coding;
 comparing said obtained measure of data loss against a predetermined data loss value;
 and if too much spatial loss has occurred, removing frames from said input clip and re-coding the input video clip to produce an output data file;
 wherein said re-coding step with even fewer frames is performed again until the degree of spatial loss has become acceptable;
 wherein the frame-rate is not allowed to drop below a predetermined minimum;
 and if too much spatial loss still occurs, audio quality is reduced.

5. The method as claimed in claim 4, wherein the measure of spatial data loss is obtained by receiving an indication of quantization or truncation.

6. The method as claimed in claim 4, wherein said measure of spatial data loss is averaged over the clip.

7. The method as claimed in claim 4, wherein the optimised data is downloaded from a server to a personal computer and then said data is transferred from said personal computer to the mobile device, wherein
 the data transferred from the server to the computer is encrypted and said encrypted file is transferred to the mobile device: and
 a decryption key is transmitted directly from the server to the mobile device.

8. The method as claimed in claim 7, wherein the decryption key is transmitted to the mobile device using a data messaging system, such as a short message service.

9. A non-transitory computer-readable medium encoded with a computer program that, when executed by a computer, causes the computer to perform a method of processing video data for downloading to mobile devices, in which the total data volume of an output file is limited, comprising the steps of:
 coding an input video clip of image frames to produce a first coded video data file having a predetermined data volume;
 obtaining a measure of spatial data loss caused by said coding;
 comparing said obtained measure of data loss against a predetermined data loss value;
 and if too much spatial loss has occurred, removing frames from said input clip and recoding the input video clip to produce an output data file;
 wherein said computer program causes said computer to perform said re-coding step again with even fewer frames is performed again until the degree of spatial loss has become acceptable;
 wherein the frame-rate is not allowed to drop below a predetermined minimum;
 and if too much spatial loss still occurs, audio quality is reduced.

10. The computer-readable medium as claimed in claim 9, wherein the measure of spatial data loss is obtained by receiving an indication of quantization or truncation.

11. The computer-readable medium as claimed in claim 9, wherein said measure of spatial data loss is averaged over the clip.

* * * * *